Aug. 21, 1934.  C. H. TAYLOR  1,970,825
BRAKE TESTING APPARATUS
Filed Oct. 19, 1928  3 Sheets-Sheet 3

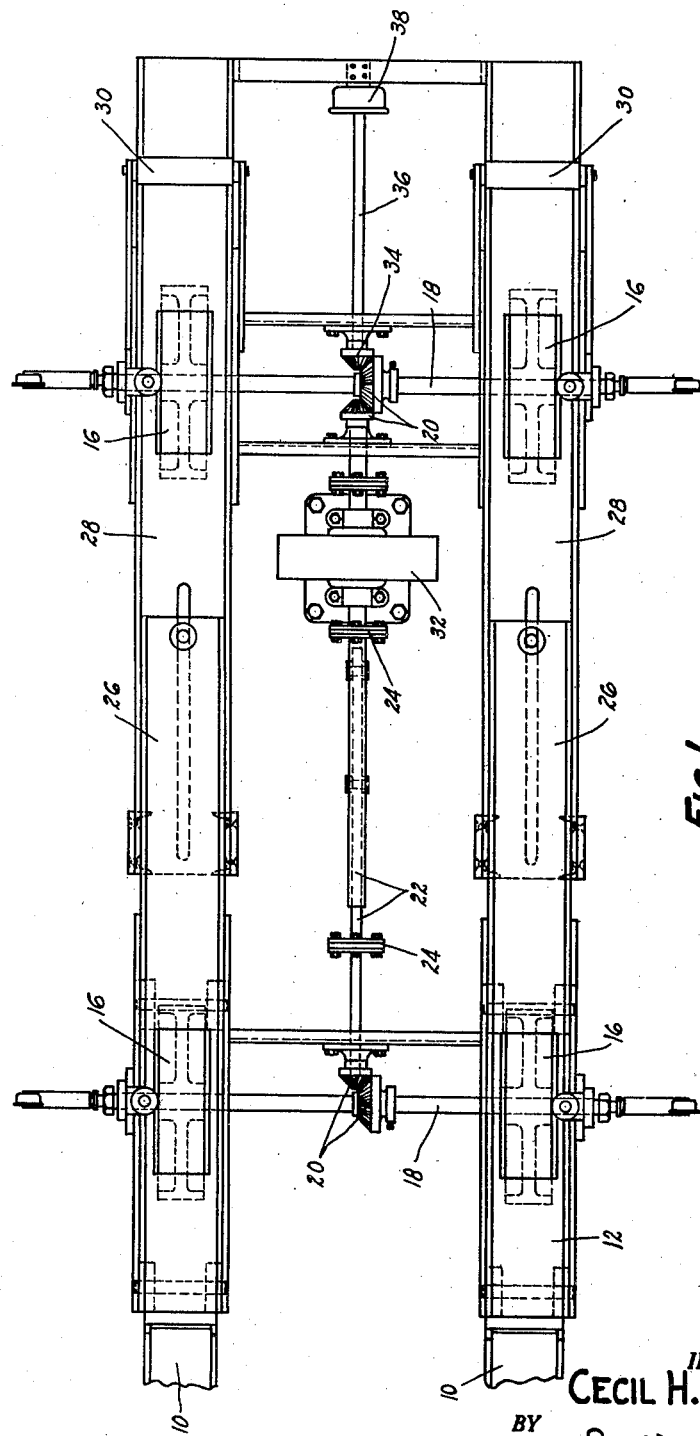

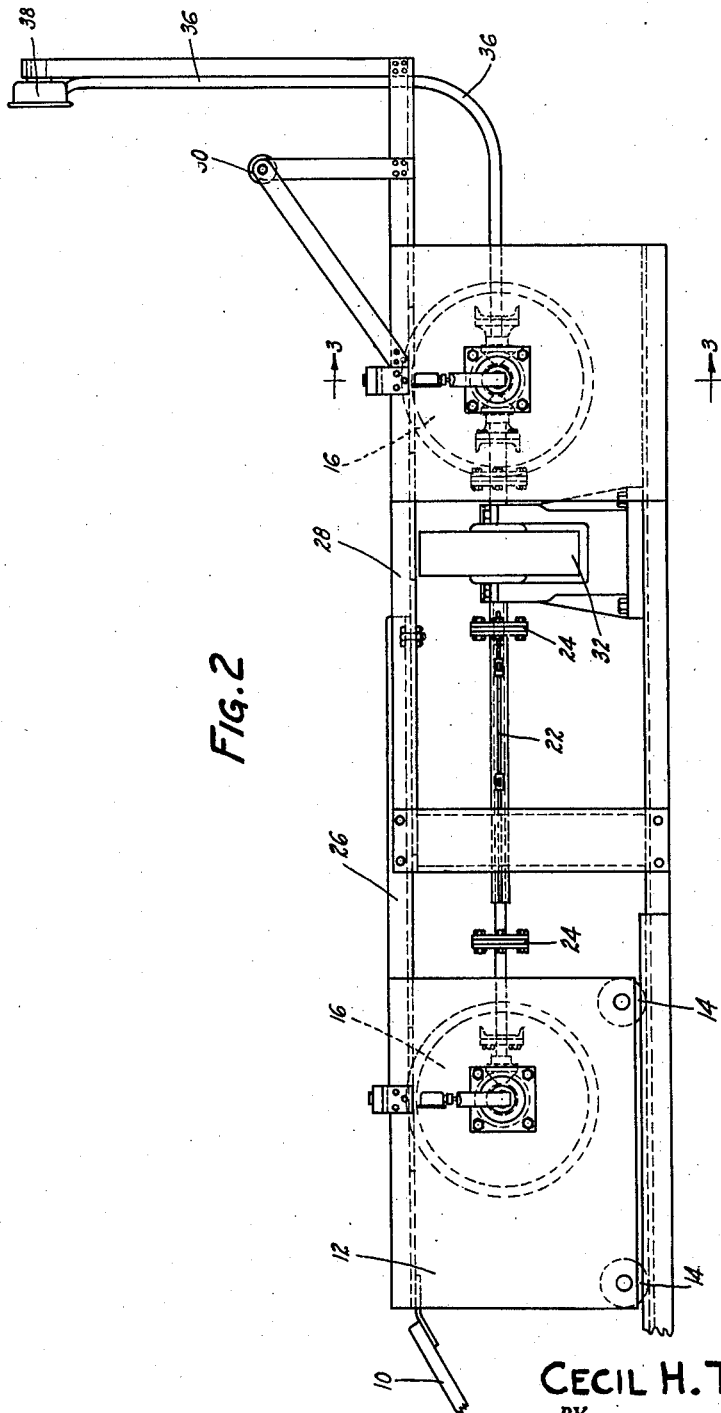

INVENTOR.
CECIL H. TAYLOR
BY
*m. W. McConkey*
ATTORNEYS.

Patented Aug. 21, 1934

1,970,825

UNITED STATES PATENT OFFICE 1,970,825

BRAKE TESTING APPARATUS

Cecil H. Taylor, South Bend, Ind., assignor, by mesne assignments, to Bendix-Cowdrey Brake Tester, Inc., New York, N. Y., a corporation of Delaware Application October 19, 1928, Serial No. 313,389

6 Claims. (Cl. 265—25)

This invention relates to the testing of automobile brakes and is illustrated as embodied in a novel apparatus which is preferably arranged to test the cumulative effect of the four brakes at the same time that it measures the effectiveness of each of the four brakes.

Preferably there is an inertia member which resists the stopping of all four of the wheels by their brakes when the brakes are applied and which gives roughly the equivalent of the retarding effect of the four brakes on the road, and which operates in conjunction with a device at each wheel which shows the effectiveness of the brake at that wheel, the five measuring devices all operating at the same time. In the arrangement shown in the drawings, the single device which shows the effectiveness of all four of the brakes does so by indicating the distance required for the four brakes to stop a heavy inertia mass from rotating. The devices which measure the effectiveness of the four individual brakes are shown as including devices which show the torque developed by driving each of the wheels against its brake.

The above and other objects and features of the invention, including various novel combinations of the parts of the measuring instrumentalities and desirable details of construction, will be apparent from the following description of one illustrative embodiment shown in the accompanying drawings, in which:

Figure 1 is a top plan view of the complete apparatus;

Figure 2 is a side elevation of the apparatus;

Figure 4:
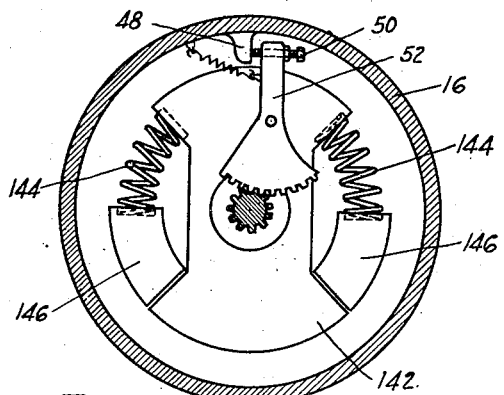
Figure 4 is a section on the line 4—4 of Figure 3 and showing parts of the measuring means.

The apparatus comprises generally ramps 10 up which the automobile may be driven and which are secured to a carriage 12 movably mounted on rollers 14 engaging a suitable track, the carriage 12 being adjustable lengthwise of the apparatus to compensate for automobiles of different wheel bases. The carriage 12 has mounted therein a pair of supporting rollers 16 for the rear wheels of the automobile and which are arranged to be driven through the mechanism shown in Figures 3 and 4 by a drive shaft 18 mounted in the carriage and connected by bevel gearing 20 to a telescoping shaft 22 which is shown as having fabric type universal joints 24 at its opposite ends. The carriage 12 also has movable ways or tracks 26 which direct the front wheels of the automobile on to stationary ways or tracks 28 over which the front wheels move on to the supporting rollers 16 for the front wheels. Suitable rollers 30 at the front end of the apparatus serve as stops preventing movement of the automobile beyond the position in which the front wheels rest on the front pair of rollers 16. The shaft 18 for the front pair of rollers 16 is also connected by bevel gearing 20 to an extension of the telescoping drive shaft 22.

At an intermediate point the drive shaft 22 is preferably provided with a rotating inertia mass such as a fly wheel 32 which must be stopped by the four brakes before the wheels of the automobile can come to rest and which therefore serves roughly as the equivalent of the inertia of the car when the brakes are applied on the road. The weight of the fly wheel 32 may be calculated to form very closely the equivalent of a car of any given weight, although ordinarily I prefer to provide a single fly wheel 32 of a weight corresponding to a car of medium weight without changing it for lighter or heavier cars. The shaft 22 may be driven by an electric motor if desired to speed up the fly wheel 32 and the four wheels resting on the rollers 16, before the brakes are applied, or if desired the electric motor may be omitted and the rear rollers 16 driven through the drive wheels of the automobile by the automobile engine which thus speeds up the fly wheel 32 and also the front rollers 16 and the front wheels resting thereon.

In either case I prefer to measure the cumulative effectiveness of the four brakes by determining the distance (i. e. number of revolutions) required to stop the fly wheel 32 or its equivalent when the brakes are applied. To this end the beveled gearing 20 for the front shaft 18 also drives a bevel gear 34 operating a flexible speedometer drive shaft 36 of the usual type which is connected to a standard automobile odometer-speedometer 38. The odometer mechanism in the instrument 38 is thrown in by its regular clutch mechanism just as the brakes are applied and can be calibrated to show either the number of revolutions of the fly wheel 32 required to stop the four wheels by the resistance of their brakes or to show the equivalent distance of stopping the car on the road. As the instrument 38 is of well known and standard construction the details of the mechanism are not shown herein.

Figure 5:
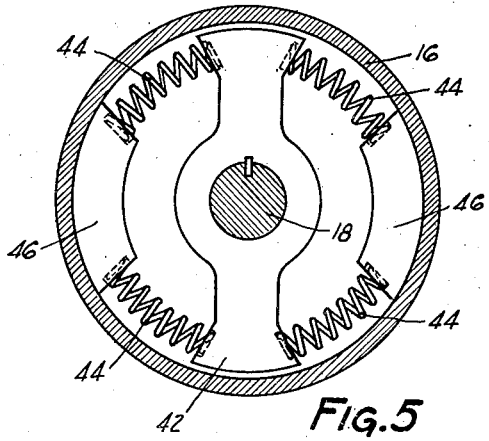
Figure 5 is a section on the line 5—5 of Figure 6.
Figure 3:
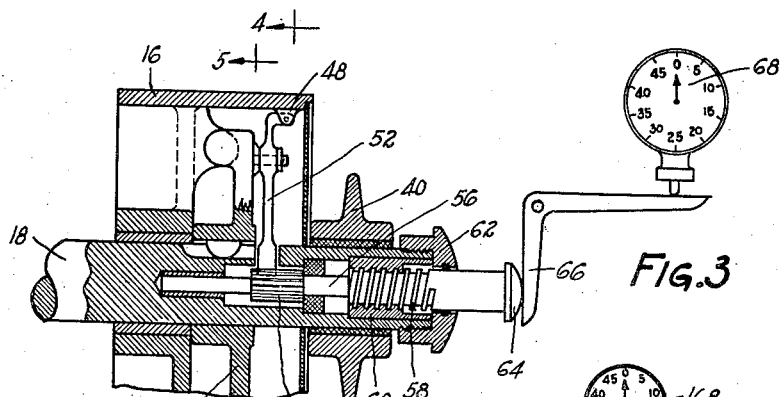
Figure 3 is a partial section on the line 3—3 of Figure 2 and showing the measuring means adjacent one of the wheels.

In addition to measuring the effectiveness of the four brakes regarded as a unit, I prefer to arrange the apparatus to measure also the individual effectiveness of each of the four brakes. To this end each of the shafts 18 drives the rollers 16 at its opposite ends through the novel mechanism shown in Figures 3 and 4 or Figures 5, 6 and 7. In the arrangement of Figures 3 and 4 the roller 16 is rotatably mounted on the end of the shaft 18 adjacent its bearing in a part 40 of the framework of the apparatus and is driven from the shaft 18 by an operating member 42 which is keyed to the shaft and which drives the roller 16 yieldingly through the medium of compressed helical springs 44 confined between its opposite ends and inwardly extending lugs 46 formed on the inner side of the roller 16. In Figures 3 and 4 there are two springs 44 yieldingly connecting the shaft 18 and the roller 16 for movement in either direction, whereas in Figure 5 there are four springs 144 connecting the driving member 142 on the shaft 18 with the roller 16 having the inwardly extending lugs 146.

The roller 16 is in either case formed with an inwardly extending projection 48 engaged by a thrust device such as a set screw 50 carried by a lever 52 pivotally mounted on the driving member 42 or 142 and formed at its lower end as a segmental rack meshing with a pinion 54 which turns a shaft 56. The shaft 56 is formed with a screw thread 58 mounted in a nut 60 seated in the end of the shaft 18 and held by a cap 62 threaded on the end of the shaft. The shaft 56 extends through a bearing in the cap 62 and is formed with a mushroom-shaped head 64 in thrust engagement with a bell crank lever 66 operating spring indicator 68 of any desired and standard construction that is capable of registering maximum indication. It will be seen that relative movement of the driving member 142 with respect to the roller 16, in driving the wheel against the resistance of its brake, will cause a slight relative angular movement of the roller 16 with respect to the shaft 18 which will displace the lever 52 in such a manner as to turn the shaft 56 and cause it to thread itself axially outward to operate the indicator 68.

Figure 6:
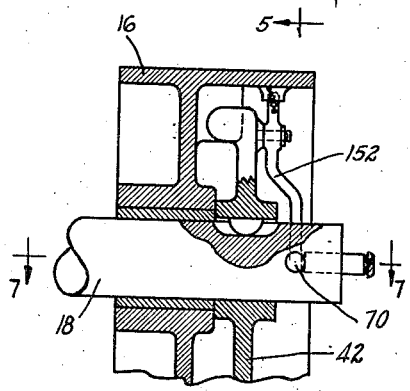
Figure 6 is a view corresponding to part of Figure 3 but showing a modification.
Figure 7:
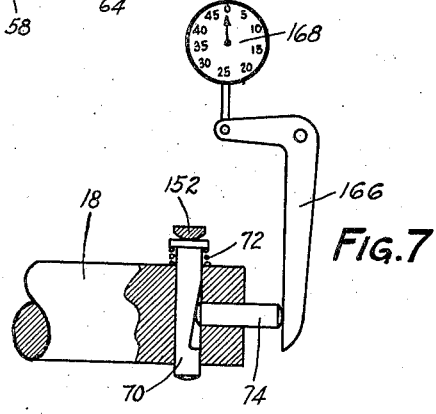
Figure 7 is a partial section on the line 7—7 of Figure 6 and showing a part of the modified measuring means.

In the arrangement of Figures 6 and 7 the lever 152 which corresponds to the lever 52 in Figure 3 thrusts a cross pin 70 against the resistance of a spring 72 to cause a wedge surface on the pin to thrust outwardly on a part 74 arranged coaxially of the shaft 18 to operate a bell crank lever 166 connected to a spring indicator 168.

It will be seen that a single application of the brakes permits a reading of the effectiveness of each of the four brakes and at the same time gives a reading of the combined effectiveness of all four of the brakes.

While several illustrative mechanisms have been described in detail, it is not my intention to limit the scope of the invention to those particular mechanisms or otherwise than by the terms of the appended claims.

I claim:

1. Brake testing apparatus comprising means for rotating the wheels of a vehicle against the resistance of their associated brakes including an inertia mass adapted to be moved by the automobile, means connected to the inertia mass for measuring the combined effectiveness of all of the brakes and a plurality of independent means all of which are operated simultaneously with the first means and each of which directly measures the effectiveness of one of said brakes.

2. Brake testing apparatus comprising means adapted to be placed in driving engagement with the four wheels of an automobile, a rotatable inertia mass driven thereby, means connected to the inertia mass or measuring the combined effectiveness of the brakes by their action in stopping the rotation of said mass, and means for directly measuring the individual effectiveness of each of said brakes during the stopping of the rotation of said mass.

3. Brake testing apparatus comprising a plurality of devices each of which is adapted to measure the effectiveness of one of the brakes of an automobile, driving mechanism interconnecting said devices, and means operated simultaneously with said devices by said driving mechanism for measuring the total movement of the driving mechanism after the brakes are applied.

4. Brake testing apparatus comprising means adapted to be placed in driving engagement with the four wheels of an automobile, a rotating inertia mass operatively connected with the wheel driving means, an odometer driven by the rotating inertia mass, and auxiliary means for individually measuring the brake resistances of the said four wheels during the rotation of said inertia mass.

5. A brake testing apparatus comprising rotatable members adapted to frictionally engage the four wheels of a vehicle for rotating the wheels against the resistance of their associated brakes, driving mechanism interconnecting said members including a divided shaft, an inertia mass connecting the divided portions of the shaft, a measuring instrument connected to the driving shaft for measuring the combined effectiveness of the four wheels, and separate measuring instruments connected to each of the rotatable members to measure the individual effectiveness of each brake.

6. A brake testing apparatus comprising rotatable members adapted to frictionally engage the four wheels of a vehicle for rotating the wheels against the resistance of their associated brakes, driving mechanism interconnecting said members, an inertia mass connected to the driving mechanism, a measuring instrument connected to the driving mechanism for measuring the combined effectiveness of the four brakes, and separate measuring instruments connected to each of the rotatable members to measure the individual effectiveness of each brake.

CECIL H. TAYLOR.